United States Patent
Takahashi (10) Patent No.: US 9,568,108 B2
(45) Date of Patent: Feb. 14, 2017

(54) BELLOWS TYPE MECHANICAL SEAL

(71) Applicant: EAGLE INDUSTRY CO., LTD., Tokyo (JP)

(72) Inventor: Hidekazu Takahashi, Tokyo (JP)

(73) Assignee: Eagle Industry Co., Ltd., Minato-Ku (JP)

( * ) Notice: Subject to any disclaimer, the term of this patent is extended or adjusted under 35 U.S.C. 154(b) by 15 days.

(21) Appl. No.: 14/696,892

(22) Filed: Apr. 27, 2015

(65) Prior Publication Data
US 2015/0226335 A1 Aug. 13, 2015

Related U.S. Application Data

(63) Continuation-in-part of application No. 13/258,827, filed as application No. PCT/JP2010/054106 on Mar. 11, 2010, now abandoned.

(30) Foreign Application Priority Data

Mar. 30, 2009 (JP) ................................ 2009-081729

(51) Int. Cl.
*F16J 15/34* (2006.01)
*F16J 15/36* (2006.01)

(52) U.S. Cl.
CPC .............. *F16J 15/363* (2013.01); *F16J 15/348* (2013.01); *F16J 15/3496* (2013.01); *F16J 15/36* (2013.01); *F16J 15/34* (2013.01)

(58) Field of Classification Search
CPC ........ F16J 15/36; F16J 15/363; F16J 15/3496; F16J 15/3464
See application file for complete search history.

(56) References Cited

U.S. PATENT DOCUMENTS 3,388,913 A * 6/1968 Tracy ...................... F16J 15/36
277/371
4,335,888 A * 6/1982 Ohba ................... F16J 15/3496
277/306
(Continued)

FOREIGN PATENT DOCUMENTS

JP 64-049772 A1 2/1989
JP 08-226548 A1 9/1996
(Continued)

OTHER PUBLICATIONS

Extended European Search Report (Application No. 10761545.2) dated Feb. 11, 2013.
(Continued)

*Primary Examiner* — Kristina Fulton
*Assistant Examiner* — Nicholas L Foster
(74) *Attorney, Agent, or Firm* — Burr & Brown, PLLC (57) ABSTRACT

A bellows type mechanical seal including a sealing ring and a mating ring, wherein either one of the sealing ring or the mating ring is retained in a housing and the other one is mounted on a shaft and wherein the sealing ring is supported by a bellows and the bellows has a retainer welded thereto on one of the sides for retaining the sealing ring and a collar welded on the other side to form a bellows assembly, is characterized in that the entire surface of the bellows assembly is covered by an erosion-resistant film formed by the physical vapor deposition, such as ion-plating.

5 Claims, 4 Drawing Sheets

(56) References Cited

U.S. PATENT DOCUMENTS

| | | | |
|---|---|---|---|
| 5,375,854 A * | 12/1994 | Carlisle | B23K 31/02 |
| | | | 277/377 |
| 5,743,536 A | 4/1998 | Komuro et al. | |
| 8,517,388 B2 * | 8/2013 | Takahashi | F16J 15/363 |
| | | | 277/370 |
| 2006/0042928 A1 | 3/2006 | Issler | |
| 2006/0222884 A1 * | 10/2006 | Nagaraj | C23C 18/1208 |
| | | | 428/688 |
| 2007/0210526 A1 * | 9/2007 | Basu | F16J 15/363 |
| | | | 277/359 |
| 2007/0228664 A1 * | 10/2007 | Anand | F16J 15/3412 |
| | | | 277/399 |
| 2007/0284255 A1 | 12/2007 | Gorokhovsky et al. | |
| 2009/0053486 A1 * | 2/2009 | Cooke | C23C 18/32 |
| | | | 428/209 |

FOREIGN PATENT DOCUMENTS

| | | |
|---|---|---|
| JP | 2000-097349 A1 | 4/2000 |
| WO | 01/44700 A1 | 6/2001 |

OTHER PUBLICATIONS

Ding et al., "Corrosion Resistance of CrAlN and TiAlN Coatings Deposited by Lateral Rotating Cathode Arc," Thin Sold Films 516, 2008, pp. 5716-5720.
International Search Report (Application No. PCT/JP2010/054106) dated Jun. 15, 2010.

* cited by examiner

BELLOWS TYPE MECHANICAL SEAL

CROSS REFERENCE TO RELATED APPLICATION

This application is a continuation-in-part of U.S. application Ser. No. 13/258,827, filed Sep. 22, 2011, which was the national stage of International Application No. PCT/JP2010/054106, filed Mar. 11, 2010, the entireties of which are incorporated herein by reference.

FIELD OF THE INVENTION

The present invention relates to a mechanical seal which can be widely applied to a variety of kinds of fields including oil refining, petrochemistry, steel making chemistry, chemicals, food, and general industrial machinery, and in particular, relates to a bellows type mechanical seal using a bellows as a secondary seal.

BACKGROUND OF THE INVENTION

Such a kind of conventional bellows type mechanical seal, when taking an example of a stationary form, is provided with a seal ring which is held by a bellows, and a mating ring which is arranged in opposition to the seal ring in a manner as to slidably contact therewith, wherein it is constructed such that the seal ring is supported by a housing, and the mating ring is supported by a rotating shaft so as to rotate together with the rotating shaft (see a first patent document).

The bellows is an integral structure in which a retainer for holding the seal ring is welded and fixed to one end of the bellows and a collar fixedly secured to the housing is welded and fixed to the other end of the bellows.

The seal ring is made of a sliding material such as carbon, and is hermetically shrink fitted or press fitted to the retainer. As a retainer material, there is used a metallic material having a low thermal expansion coefficient of about $5 \times 10^{-6}$ 1/degrees C., which is approximate to the coefficient of thermal expansion of carbon, etc., such as, for example, 42% Ni—Fe, etc. By making the coefficient of thermal expansion of the seal ring approximate to that of the retainer, a change in the shrink fit margin can be reduced even if it becomes a high temperature, so that a change in shrink fit stress can be reduced, and the flatness of the end faces of the seal can be held.

On the other hand, for the bellows, there is used a metal having a spring nature, such as Inconel 718, Inconel 625 (Inconel is a registered trademark), AM350, etc.

PRIOR ART REFERENCES

First Patent Document: Japanese Patent Application Laid-Open No. 2000-97349

SUMMARY OF THE INVENTION

However, in the case of a sealing liquid with corrosion factors such as sulfur, hydrogen sulfide, etc., mixed therein, 42% Ni—Fe, being a suitable retainer material, is remarkable in corrosion, as compared with Inconels, etc., which are bellows materials. For the purpose of preventing corrosion, anti-corrosion plating should be done on the surface of the retainer and the welded portion thereof, but when the retainer is welded to the bellows after being plated, there is a fear that the plating of the welded portion may peel off, or defective plated portions such as blow holes, cavities, etc., may occur, thus resulting in that the welded portion may be corroded.

On the other hand, in cases where plating is carried out on the retainer and the welded portion after welding, the bellows, if plated, will change its property, so it is necessary to mask the bellows, but masking work is troublesome, and masking may be insufficient so that the bellows will also be plated, or the welded portion is not plated, as a result of which any sufficient anti-corrosion effect may not be obtained. Therefore, under highly corrosive environments, 42% Ni—Fe will not be able to be used as a retainer material, and hence, materials to be used are limited.

The present invention has been made so as to solve the problems of the conventional technique as referred to above, and has for its object to provide a bellows type mechanical seal which is able to improve the corrosion resistance of a bellows assembly in which a retainer, a bellows and a collar are integrally welded and fixed to one another, without limiting materials to be used.

In order to achieve the above-mentioned object, the present invention resides in a bellows type mechanical seal which is a mechanical seal for providing sealing between a rotating shaft and a housing, and which is provided with a seal ring and a mating ring that is arranged in opposition to the seal ring so as to be in sliding contact therewith, wherein one of the seal ring and the mating ring is supported by the housing, and the other thereof is supported on the rotating shaft so as to rotate together with the rotating shaft, wherein the seal ring is supported through a bellows, and the bellows is constructed as a bellows assembly of an integral structure in which a retainer for holding the seal ring is welded and fixed to one end of the bellows, and a collar fixedly secured to the rotating shaft is welded and fixed to the other end of the bellows, and wherein the entire surface of the bellows assembly, after the bellows, the retainer and the collar are welded to one another, is covered with an anti-corrosion coating film formed by a physical vapor deposition method (PVD processing).

It is suitable that the anti-corrosion coating film be formed of a metal nitride based material having corrosion resistance, and it is preferable that the thickness thereof be 10 µm or less.

A material for the retainer holding the seal ring is one which has a coefficient of thermal expansion approximate to or lower than that of the seal ring.

In addition, there may be provided a coupling structure in which the seal ring is separated from the retainer, and a retainer-side end face of the seal ring and a seal ring-side end face of the retainer are in close contact with each other in a manner to be freely slidable relative to each other in a circumferential direction.

According to the present invention, the anti-corrosion coating film is formed on the entire surface of the bellows assembly after the retainer, the bellows and the collar are mutually welded to one another by means of a physical vapor deposition method. With such a construction, the entire surface of the bellows assembly has uniform corrosion resistance. Accordingly, optimal materials can be selected as materials for the retainer, the bellows and the collar in consideration of their coefficients of thermal expansion, etc., without taking their corrosion resistance into consideration.

When the anti-corrosion coating film is formed of a metal nitride based material such as chromium nitride, it is possible to form a coating film which is excellent in corrosion resistance.

For example, a hot bottom liquid of a temperature of 200 degrees C. or above in petroleum refinery contains sulfur and hydrogen sulfide, so in cases where 42% Ni—Fe is used as a retainer material, the retainer, if used in petroleum refinery, is remarkably corroded. In addition, in such a condition, pitting corrosion may occur even with highly corrosion-resistant Inconel 718 which is used for the bellows. However, if anti-corrosion ion plating such as chromium nitride plating is applied, an anti-corrosion coating film such as chromium nitride like a stainless oxide layer can be deposited on the entire surface of the bellows assembly in a uniform manner, whereby the bellows assembly as a whole can obtain corrosion resistance equal to or higher than that of Inconel 718.

In addition, the load of the bellows is increased by the anti-corrosion coating film, but by making the thickness of the anti-corrosion coating film equal to or less than 10 μm, an increase in the load can be suppressed as much as possible, and no influence is exerted even on sealing performance and durability.

If the material for the retainer holding the seal ring is one such as 42% Ni—Fe which has a coefficient of thermal expansion approximate to or lower than that of the seal ring, a stress change in the fitting portions of the seal ring and the retainer is small, and the flatness of the end faces of the seal is held, thus making it possible to enhance corrosion resistance, while maintaining sealing efficiency.

If it is constructed such that the seal ring is separated from the retainer, a sliding torque between the seal ring and the mating ring will hardly act on a seal end face of the retainer. Even if the sliding torque acts on the retainer's seal end face, a seal end face of the seal ring can slide so that the sliding torque can be suppressed to a minimum. In addition, the seal ring does not rotate, so the seal ring and the retainer only slide by a tiny amount of displacement due to a minute or fine vibration thereof in a circumferential direction by a stick slip motion, and are almost close to a stationary state. Accordingly, there is also no generation of heat due to sliding, so a lubricating film between the seal end faces is stabilized, thus making it possible to hold excellent sealing performance.

DETAILED DESCRIPTION OF THE INVENTION

In the following, the present invention will be described in detail based on preferred embodiments thereof as illustrated.

However, the dimensions, materials, shapes, relative arrangements and so on of component parts described in the embodiments are not intended to limit the scope of the present invention to these alone in particular as long as there are no specific statements.

First Embodiment

Figure 1:
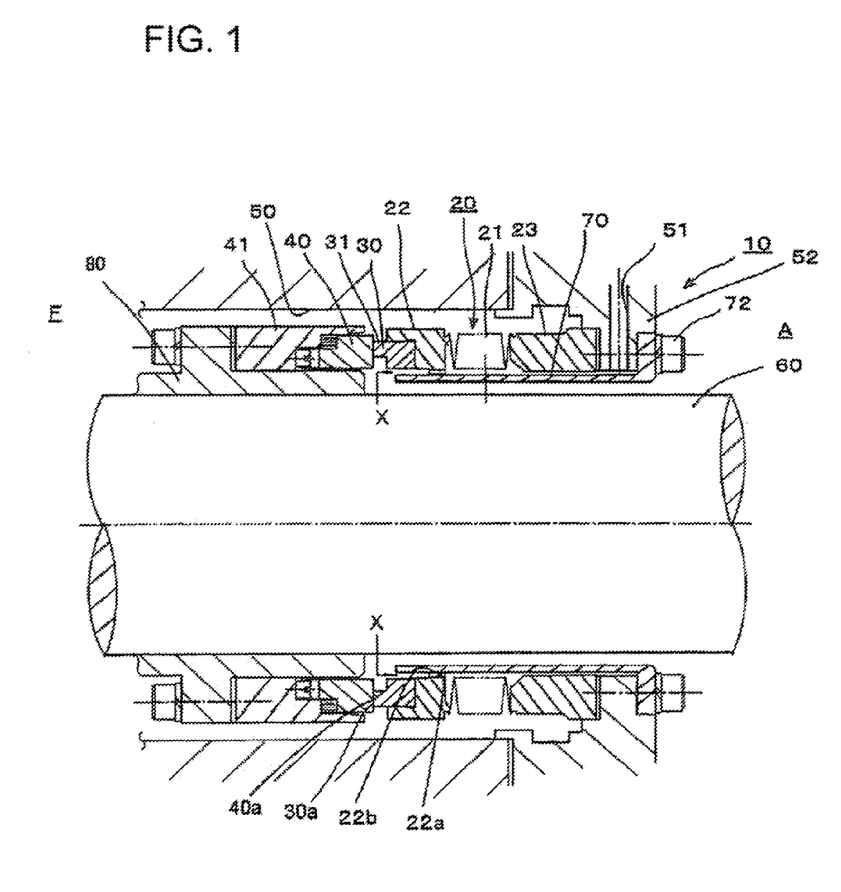
FIG. 1 is a cross sectional view of a bellows type mechanical seal related to a first embodiment of the present invention.

FIG. 1 shows a bellows type mechanical seal related to a first embodiment of the present invention, wherein 10 denotes the whole of the bellows type mechanical seal.

That is, this bellows type mechanical seal 10 serves to provide a sealing between a rotating shaft 60 and a housing 50, and is provided with a seal ring 30 and a mating ring 40 which is arranged in opposition to the seal ring 30 so as to be in sliding contact therewith. In this embodiment, the bellows type mechanical seal 10 is a stationary type mechanical seal, the construction of which is such that the seal ring 30 is supported by the housing 50 through a seal cover 52, and the mating ring 40 is supported on the rotating shaft 60 so as to rotate together with the rotating shaft 60. In addition, a fixed sleeve 80 is fitted and fixed to the rotating shaft 60, and a retainer 41 holding the mating ring 40 is fixedly secured to this fixed sleeve 80. In this figure (FIG. 1), assuming that the outside of the seal is denoted by A and the inside of the seal, which is to be sealed, is denoted by F, the seal ring 30 is arranged in the outside A of the seal, and the mating ring 40 is arranged in the inside F of the seal. Also, the seal cover 52 is fixedly secured to an end face of the housing 50 which is in the outside of the seal.

The seal ring 30 is constructed such that it is supported by the seal cover 52 through a bellows 21, and the bellows 21 is constructed as a bellows assembly 20 of an integral structure in which a retainer 22 for holding the seal ring 30 is welded and fixed to one end of the bellows 21 and a collar 23 fixedly secured to the seal cover 52 is welded and fixed to the other end of the bellows 21.

The seal ring 30 is an annular member which is composed of a sliding material such as carbon, and the seal ring 30 has a convex portion 31 which is in sliding contact with the mating ring 40, so that the sliding surfaces of the seal ring 30 and the mating ring 40, which are the seal end faces 30a, 40a thereof, respectively, are orthogonal surfaces which are arranged in orthogonal relation to the central axis of the rotating shaft 60.

In cases where a sealing fluid is a liquid of property which has fluidity at high temperatures but is solidified at the time when the temperature falls, like tar or pitch, there is a fear that the seal end faces 30a, 40a of the seal ring 30 and the mating ring 40 may stick to each other after a pump is stopped, and an excessive torque may act on the seal end faces 30a, 40a simultaneously at the time when the pump is started or actuated, and then propagate to the bellows 21 so that an excessive torsion torque may act on the bellows 21. In the case of a thermal melting fluid such as tar, pitch, asphalt, etc., or in the case of a high temperature fluid including a lot of solid contents, it is effective to use, as a combination of sliding materials, materials harder than carbon, such as silicon carbide, cemented carbide, sintered hard alloy, etc.

The bellows 21 is made of metal and have a bellows portion that is expandable and contractible in an axial direction. The illustration of a specific shape of the bellows 21 is omitted in FIGS. 1 and 2. The shape structure of the bellows portion is not limited in particular. The retainer 22 is a cylindrical member made of metal, with its inner periphery being formed into a stepped shape, and the seal ring 30 has its outer periphery fixedly secured to the smaller diameter inner peripheral surface of the retainer 22 by means of press fit or shrinkage fit. On the other hand, the collar 23 is also a cylindrical member made of metal, and the bellows 21 has its one end fixedly secured to one end of the collar 23 by welding, and its other end fixedly secured on its outer periphery to the seal cover 52.

A cylindrical baffle sleeve 70 is inserted into gaps which are defined between the rotating shaft 60 and the individual inner peripheral sides of the seal ring 30, the retainer 22, the bellows 21, and the collar 23, respectively. The baffle sleeve 70 has its one end fixedly secured to the seal cover 52 by means of bolts 72, and its other end extended to the inner periphery portion of the retainer 22. The baffle sleeve 70 serves to guide a quenching liquid supplied from a quenching hole 51 formed in the seal cover 52 to the sliding surfaces of the seal ring 30 and the mating ring 40.

Figure 2:
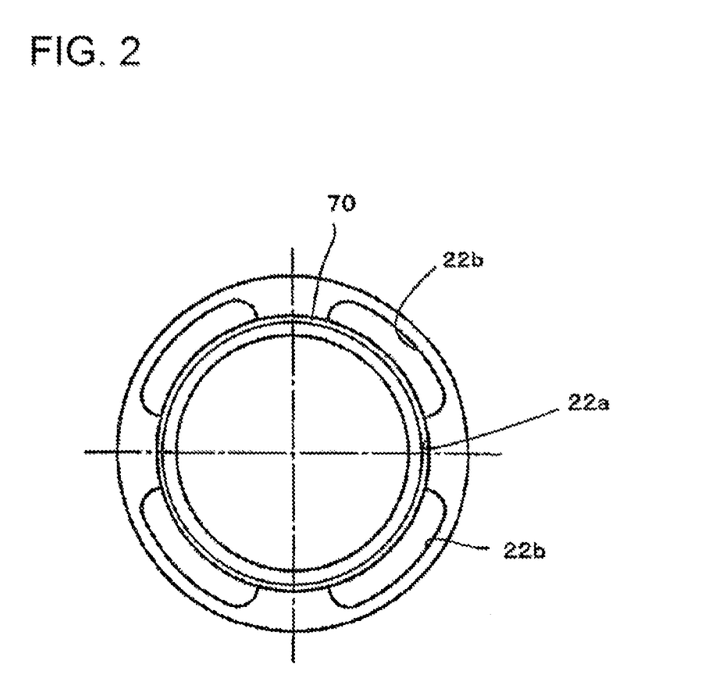
FIG. 2 is a view exaggeratedly showing the state of a gap seen from an X direction of FIG. 1.

On the inner periphery portion of the retainer 22 which holds the seal ring 30, as exaggeratedly shown in FIG. 2, there is formed a narrowing portion 22*a* which protrudes towards the outer periphery of the baffle sleeve 70 so as to narrow the gap between the retainer 22 and the baffle sleeve 70 into a minute or smaller one. In addition, one or a plurality of notches 22*b* are formed on the narrowing portion 22*a* in a circumferential direction thereof thereby to form a passage for the quenching liquid.

Figure 4:
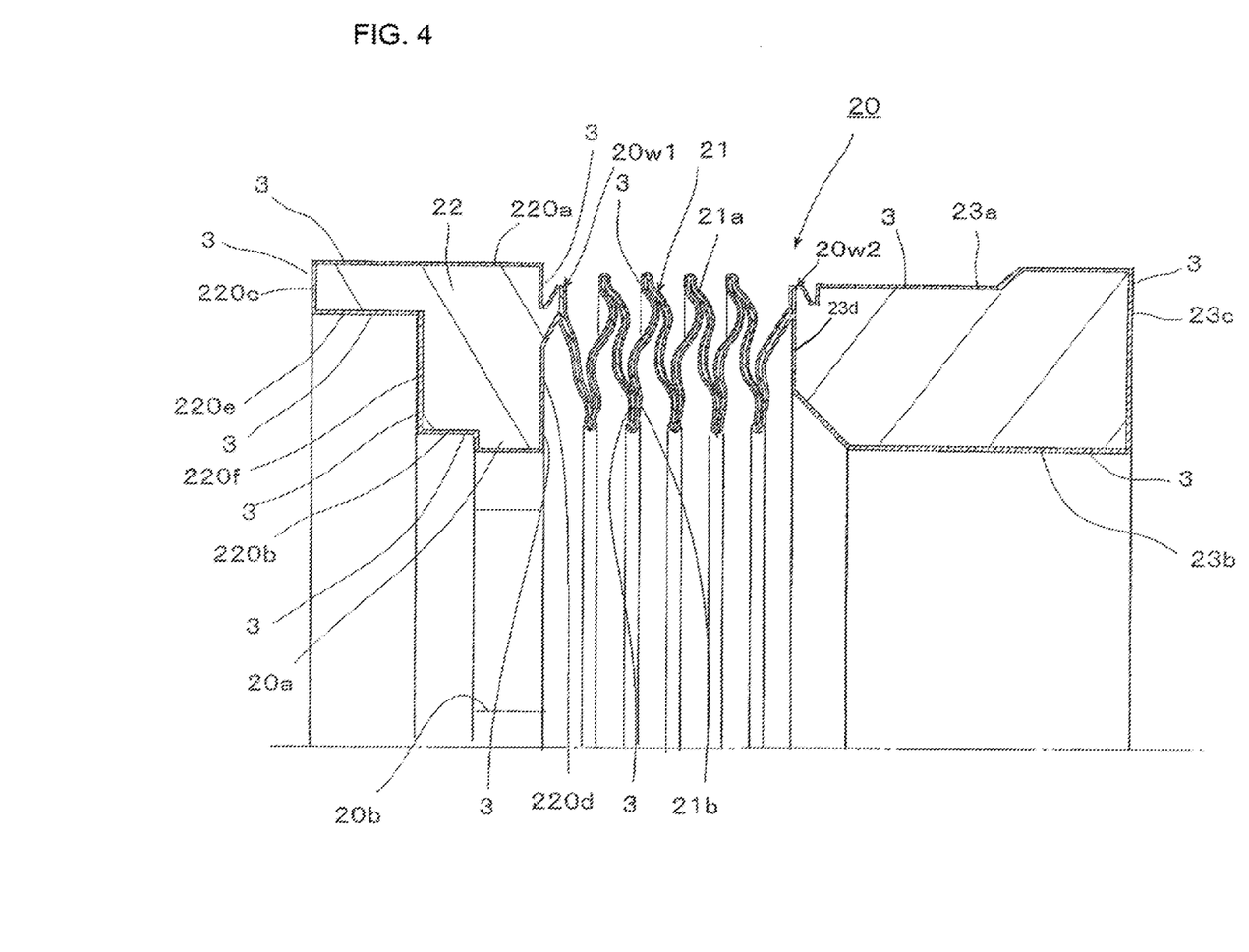
FIG. 4 is a cross sectional view of a bellows type assembly exaggeratedly showing the anti-corrosion coating film of the present invention.

FIG. 4 shows a cross sectional view of the bellows assembly exaggeratedly showing the anti-corrosion coating film 3.

The bellows shown in FIG. 4 shows one example of a specific configuration of the welded bellows.

The bellows 21 is an accordion-like member made of metal such as Inconel 625. As shown in FIG. 4, the bellows 21 is configured by coupling the inner peripheral parts or the outer peripheral parts of a plurality of metal discs (metal diaphragm plates) formed to have a wave-like cross section to each other by welding and the like so as to become an accordion-like tube shape as a whole.

The configuration of the bellows used of the present invention is not limited to the configuration shown in FIG. 4.

The anti-corrosion coating film is disposed over every surface of the bellows assembly 20. That is, every surface, an outer surface 21*a* and an inner surface 21*b* of the bellows 21, and outer surface 220*a*, an inner surface 220*b*, end surface 220*c*, 220*d*, step inner surface 220*e*, step end surface 220*f*, narrowing portion 22*a* and notches 22*b* of the retainer 22, an outer surface 23*a* and an inner surface 23*b* and end surface 23*c*, 23*d* of the collar 23 and welded portion 20*w*1, 20*w*2 is completely covered with the anti-corrosion coating film 3 without any space.

The anti-corrosion coating film 3 is formed on the entire surface of the bellows assembly 20 after the retainer 22, the bellows 21 and the collar 23 are mutually welded to one another, by means of a physical vapor deposition method. So, the anti-corrosion coating film 3 can be deposited on the entire surface of the bellows assembly 20 in a uniform manner.

That is, the bellows assembly 20 only has a single anti-corrosion coating film 3 that comprises a single layer of material for coating, with the coating disposed over every surface of the bellows assembly 20.

In the present invention, the entire surface of the bellows assembly 20 of the welded integral construction as stated above is covered with an anti-corrosion coating film by means of an ion plating process as a physical vapor deposition method (PVD). That is, ion plating is performed after the retainer 22, the bellows 21, and the collar 23 are integrally welded to one another. The physical vapor deposition method is not limited to the ion plating, but there may be adopted other methods such as vacuum deposition, sputtering, etc.

In this embodiment, the entire surface of the retainer 41 holding the mating ring 40 is also covered with an anti-corrosion coating film by means of ion plating. To the baffle sleeve 70, a hard material such as SUS630 or hard chrome plating may be applied. A corrosion and wear resistant ion plating may be applied to the baffle sleeve 70, as in the case of the bellows assembly 20.

The anti-corrosion coating film deposited by the ion plating is composed of metal nitride based materials having corrosion resistance, such as special chromium nitride, titanium nitride, etc. Preferably, the thickness of the anti-corrosion coating film is equal to or less than 10 μm, and in particular more preferably, the thickness is about 5 to 6 μm. Thus, although the load of the bellows 21 increases, an increase of the load can be suppressed to about 10%, and it is possible to avoid influencing sealing performance and durability by taking account of design consideration.

The materials for the retainers 22, 41 holding the seal ring 30 and the mating ring 40 should be those materials, like 42% Ni—Fe, which have a coefficient of thermal expansion approximate to or less than that of sliding materials such as carbon, silicon carbide, etc., which constitute the seal ring 30 and the mating ring 40.

On the other hand, as the material for the bellows 21, a metal having a spring property, such as Inconel 718, Inconel 625, AM350, etc., is used as usual. In particular, AM350, being lower in corrosion resistance as compared with Inconel 718, has a spring characteristic and a mechanical strength at the time of high temperature, equivalent to those of Inconel 718, and is excellent in weldability. Accordingly, the cost can be reduced to a large extent by using AM350 for the bellows material.

Here, in cases where the difference in the coefficient of thermal expansion between the bellows 21 and the retainer 22 is large, at high temperatures, the amount of thermal expansion of the bellows 21 becomes large, so that the retainer 22 will be pulled by the bellows 21, thus giving rise to a fear that the retainer 22 may be subjected to a minute deformation. When the retainer 22 is subjected to a minute deformation, the seal ring 30 shrink fitted or press fitted to the retainer 22 is also subjected to an infinitesimal deformation, so there will be a fear that it may become unable to hold the flatness of the sliding surface.

Accordingly, it is preferable that the bellows 21 and the retainer 22 be composed of an identical material or dissimilar metals which have coefficients of thermal expansion substantially approximate to each other. The selection of materials should be made in an appropriate manner according to the condition of operating temperature and the size of each part. For example, as the material for the retainer 22, it is preferable to use 42% Ni—Fe or Inconel 625, and as the material for the bellows 21, it is preferable to use Inconel 625.

Second Embodiment

Next, a second embodiment of the present invention will be described.

Figure 3:
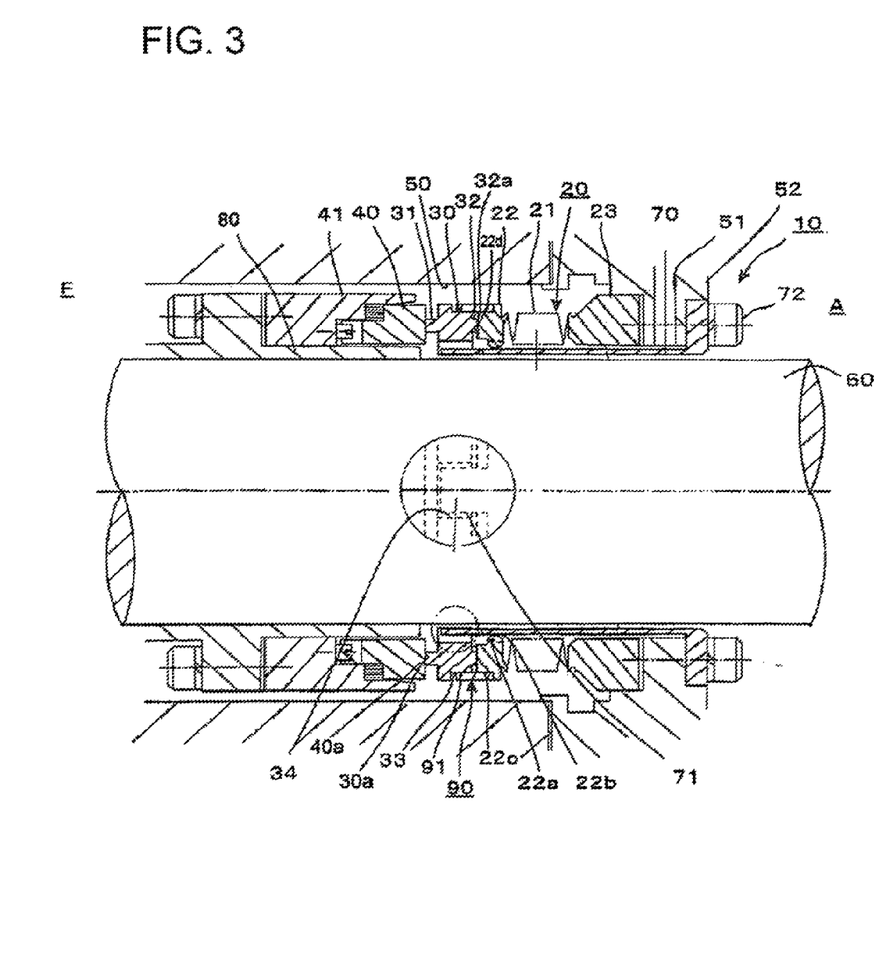
FIG. 3 is a cross sectional view of a bellows type mechanical seal related to a second embodiment of the present invention.

FIG. 3 shows a bellows type mechanical seal related to the second embodiment of the present invention. In the following explanation, only different features will be described, and the same symbols will be given to the same components as those of the first embodiment, and the explanation thereof will be omitted.

In this second embodiment, it is not a construction in which the seal ring 30 is fitted to the retainer 22, but a coupling structure in which the seal ring 30 is separated from the retainer 22, and a retainer-side end face of the seal ring 30 and a seal ring-side end face of the retainer 22 are in close contact with each other in a manner to be mutually freely slidable relative to each other in a circumferential direction. Hereinafter, this coupling structure is called a lap joint part 90.

That is, an annular nose 32 is formed to protrude on the retainer-side end face of the seal ring 30. This nose 32 has an end face in the form of a seal end face 32a which has been lap finished to a flatness or surface roughness equivalent to that of the seal end face 30a of the seal ring 30 at the side of the mating ring 40. The end face of the nose 32 is in close contact with a seal end face 22d which is the seal ring-side end face of the retainer 22 arranged in opposition thereto.

The surface width of the seal end face 32a of the nose 32 of the seal ring 30 is set to be substantially the same as or slightly narrower than the surface width of the seal end face 30a which is in contact with the mating ring 40. A stepped portion 33 is formed on the outer periphery of the seal ring 30 at the opposite side of the mating ring, and at the same time, a stepped portion 22c is also formed on the outer periphery of the retainer 22 at the side of the seal ring. A cylindrical adapter 91 is inserted in between both the stepped portions 33, 22c in a straddled manner with a minute gap formed in a diametrical direction, so that the retainer 22 and the seal ring 30 are made in alignment with each other.

In this second embodiment, the bellows assembly 20 has an integral structure in which the retainer 22 having the seal end face 22d formed thereon, the bellows 21 and the collar 23 are mutually welded and fixed to one another, and the entire surface of this bellows assembly 20 is covered with an anti-corrosion coating film by means of ion plating. Accordingly, the seal end face 22d at the side of the seal ring, with which the seal ring 30 is in sliding contact, is also covered with the anti-corrosion coating film by means of ion plating.

In addition, one or a plurality of notches 34 are formed on the inner periphery side of the seal ring 30. On the other hand, the baffle sleeve 70 is formed at its distal end with protruded portions 71 which are in engagement with the notches 34 of the seal ring 30 with minute gaps therebetween in such a manner as to allow the seal ring 30 to freely move in an axial direction, wherein the rotation of the seal ring 30 is restricted by the engagement of the notches 34 and the protruded portions 71. The side edges of the protruded portions 71 of the baffle sleeve 70 and the side edges of the notches 34 of the seal ring 22 receive torques from each other, and rub and abrade with each other, so that they are easy to wear. As a result, it is preferable to suppress wear of the baffle sleeve 70 by having it made of a hard material such as SUS630, or by subjecting it to a surface hardening treatment such as hard chrome plating, wear-resistant ion plating, etc.

The seal end face 30a of the seal ring 30, which is in sliding contact with the mating ring 40, is made into contact with the seal end face 40a of the mating ring 40 in a hermetically sealed manner by the spring load of the bellows 21 plus the pressing force of fluid pressure. On the other hand, the seal ring 30 does not rotate, so the retainer-side seal end face 32a of the seal ring 30 becomes a sealing surface which is not subjected to rotation-caused sliding movement and hence is in a substantially stationary state.

The seal end faces 30a, 40a of the seal ring 30 and the mating ring 40 become small in their coefficient of friction when they have good lubricity, so a sliding torque between these seal end faces is small, as a result of which when lubrication therebetween becomes worse, braking will take place and the sliding torque will become larger. In cases where the lubrication between the seal end faces is in an unstable condition, for example, in cases where the sealing liquid is a low boiling liquid or a volatile liquid, or in cases where a lubricating film between the seal end faces is fractured under a high load condition and lubricity is poor, under an operating condition in which there is a change in temperature or pressure, the seal end face 30a of the seal ring 30 causes a fine vibration in a circumferential direction at high cycle or frequency (stick slip), and the sliding torque also varies at high cycle or frequency. There is a fear that this fine vibration in the circumferential direction at high cycle may propagate to the bellows 21 by way of the retainer 22, and the bellows 21 may vibrate (twist-return) at high cycle.

In contrast to this, if it is constructed such that the seal ring 30 is separated from the retainer 22 by means of the lap joint part 90, as shown in this second embodiment, the sliding torque between the seal ring 30 and the mating ring 40 will hardly act on the seal end face 22d of the retainer 22. Even if it acts like that, the seal end face 32a of the seal ring 30 can slide so that the sliding torque can be suppressed to a minimum.

In addition, the seal ring 30 does not rotate, so the lap joint part 90 only slides by a tiny amount of displacement due to a minute vibration thereof in a circumferential direction by a stick slip motion, and is almost close to a stationary state. Accordingly, there is also no generation of heat due to sliding, so the lubricating film between the seal end faces is stabilized, thus making it possible to hold excellent sealing performance.

In addition, the bellows 21 can be a non-torque bellows in which no sliding torque is generated or acted between the bellows 21 and the mating ring 40, so there is generated no fine vibration of high cycle due to a stick slip, and hence there is no fear that the bellows 21 may be subjected to fatigue failure. Moreover, the reuse rate of the bellows assembly 20 can be improved to a large extent in the case of a repair, too.

Because the bellows assembly 20 is separated, even if the seal end face of the seal ring 30, which is in sliding contact with the mating ring 40, is damaged, replacement of the seal ring 30 only should be made, thus making it possible to reduce the cost of replacement parts.

In addition, even if the seal end faces 32a, 22d are stuck to each other so that a fine vibration due to a stick slip can propagate to the bellows 21, or if the baffle sleeve 70 becomes unable to receive torque due to the wear of the protruded portions 71 thereof to allow a sliding torque to act on the bellows 21 thereby to cause vibration in the bellows 21, the vibration of the bellows 21 is prevented or stopped by the narrowing portion 22a formed on the inner periphery portion of the retainer 22, so fatigue of the bellows 21 can be extended, thus making it possible to ensure durability thereof.

Here, note that in the above-mentioned respective embodiments, reference has been made to stationary bellows type mechanical seals, but it of course goes without saying that the present invention can be applied to a rotary type one in which a seal ring held by a bellows assembly is mounted on a rotating shaft so as to rotate integrally with the rotating shaft.

EXPLANATION OF REFERENCE NUMERALS AND CHARACTERS

10 Bellows type mechanical seal
20 Bellows assembly
21 Bellows

21a Outer surface
21b Inner surface
22 Retainer
22a Narrowing portion
22b Notches
22c Stepped portion
22d Seal end face
23 Collar
23a Outer surface
23b Inner surface
23c, 23d End surface
30 Seal ring
31 Convex portion
32 Nose
32 Seal end face
33 Stepped portion
34 Notches
40 Mating ring
41 Retainer
50 Housing
51 Quenching hole
52 Seal cover
60 Rotating shaft
70 Baffle sleeve
72 Bolts
80 Fixed sleeve
90 Lap joint part
91 Adapter
220a Outer surface
220b Inner surface
220c, 220d End surface
220d End surface
220e Step inner surface
220f Step end surface
20w1, 20w2 Welded portion
A Outside of the seal
F Inside of the seal

The invention claimed is:

1. A bellows type mechanical seal providing sealing between a rotating shaft and a housing, the bellows type mechanical seal comprising:

a seal ring, and a mating ring that is arranged in opposition to said seal ring so as to be in sliding contact therewith, wherein one of said seal ring and said mating ring is supported by said housing, and the other thereof is supported on said rotating shaft so as to rotate together with said rotating shaft, wherein said seal ring is supported through a bellows having two ends, and said bellows is constructed as a bellows assembly of an integral structure in which a retainer for holding said seal ring is welded and fixed to one of the ends of said bellows and a collar is welded and fixed to the other of the ends of said bellows, and wherein the bellows assembly, after said bellows, said retainer and said collar are welded to one another, is covered with an anti-corrosion coating film formed by means of a physical vapor deposition method, and the bellows assembly only has a single anti-corrosion coating film that comprises a single layer of material, with the anti-corrosion coating film disposed over every surface of the bellows assembly.

2. The bellows type mechanical seal as set forth in claim 1, wherein said anti-corrosion coating film is composed of a metal nitride based material having corrosion resistance.

3. The bellows type mechanical seal as set forth in claim 1, wherein said anti-corrosion coating film has a thickness of 10 μm or less.

4. The bellows type mechanical seal as set forth in claim 1, wherein a material for said retainer holding said seal ring is one which has a coefficient of thermal expansion approximate to or lower than that of said seal ring.

5. The bellows type mechanical seal as set forth in claim 1, wherein said seal has a coupling structure in which said seal ring is separated from said retainer, and a retainer-side end face of said seal ring and a seal ring-side end face of said retainer are in close contact with each other in a manner to be freely slidable relative to each other in a circumferential direction.

* * * * *